United States Patent [19]

Lorenz

[11] Patent Number: 4,767,658
[45] Date of Patent: Aug. 30, 1988

[54] RUBBER SHEETING WITH INTEGRAL ADHESIVE EDGE

[75] Inventor: Harold K. Lorenz, Marion, Mass.

[73] Assignee: The Goodyear Tire & Rubber Company, Akron, Ohio

[21] Appl. No.: 6,274

[22] Filed: Jan. 20, 1987

Related U.S. Application Data

[63] Continuation of Ser. No. 715,554, Mar. 25, 1985, abandoned.

[51] Int. Cl.$^4$ ............................................. B32B 3/00
[52] U.S. Cl. ................................... 428/192; 428/517; 428/519
[58] Field of Search .................. 428/57, 517, 519, 192, 428/494, 520, 451

[56] References Cited

U.S. PATENT DOCUMENTS

| | | | |
|---|---|---|---|
| 3,264,168 | 8/1966 | Sneary | 428/517 X |
| 4,153,748 | 5/1979 | Bischoff | 428/517 X |
| 4,297,411 | 10/1981 | Weiner | 428/517 X |
| 4,511,619 | 4/1985 | Kuhnel et al. | 428/517 X |
| 4,537,825 | 8/1985 | Yardley | 428/517 X |

FOREIGN PATENT DOCUMENTS

| | | | |
|---|---|---|---|
| 1544847 | 7/1969 | Fed. Rep. of Germany | 428/517 |
| 2125309 | 12/1971 | Fed. Rep. of Germany | 428/517 |
| 1382826 | 2/1975 | United Kingdom | 428/517 |

Primary Examiner—Nancy A. B. Swisher
Attorney, Agent, or Firm—M. R. Dion, Sr.

[57] ABSTRACT

Fully cured thermoset ethylene-propylene rubber sheets having integral thermoplastic adhesive strips molded along the lateral edges are produced using a manufacturing method where the strips are applied prior to vulcanization of the rubber sheeting. The factory applied adhesive strip is non-tacky and dry but is activated by heat to securely bond the ethylene-propylene rubber sheets together in an overlap splicing procedure. A method of using the integral adhesive rubber sheeting for single-ply rubber roofing membrane or pond liners is also disclosed. Instantaneous attainment of maximum seam strength, water tightness and consistency of the seams are advantages over conventional solvent-based adhesive methods.

10 Claims, 1 Drawing Sheet

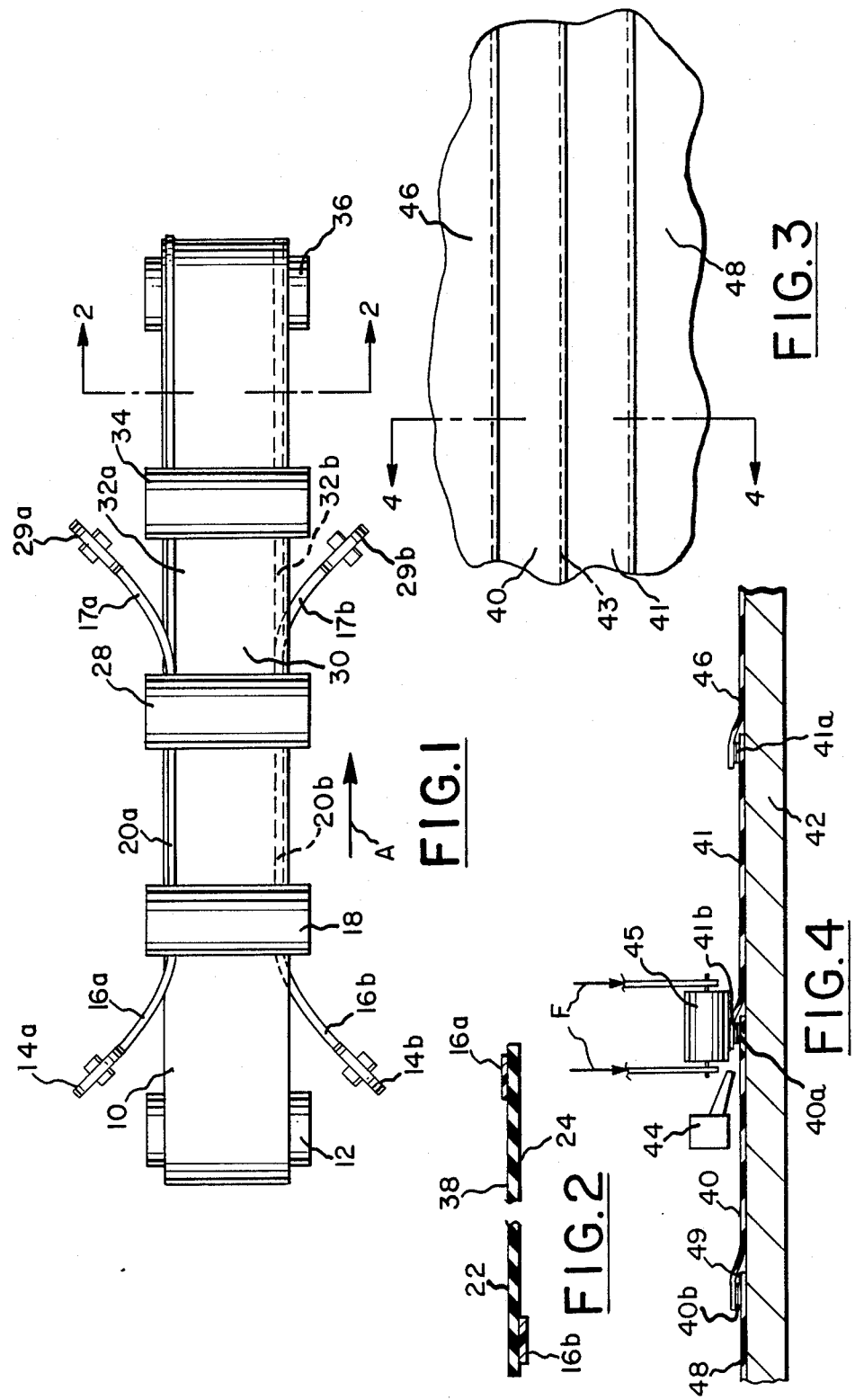

4,767,658

RUBBER SHEETING WITH INTEGRAL ADHESIVE EDGE

This is a continuation of application Ser. No. 715,554 filed on Mar. 25, 1985, now abandoned.

BACKGROUND OF THE INVENTION

This invention relates to thin rubber sheeting or membranes useful for covering roofs of building structures. In particular, the rubber sheeting of this invention includes an integral adhesive on the edges which can be used to adhere adjacent sheets to one another to form a water-tight geomembrane. The membrane is useful in roofing as well as pond linings, tank linings and other applications where relatively thin rubber sheeting is used to protect a surface from its environment.

The long standing problem in roofing and lining applications is the establishment of strong water-tight seams between adjacent rubber sheets. Ethylene-propylene based thermosetting rubbers such as EPDM and EPM type rubbers are very weather-resistant but are long recognized to be difficult to adhesively bond together. The seams must be capable of withstanding the environmental stresses placed on the sheeting during high winds, heavy rains, snows, ice storms. Flat roofs pose unique problems to roofing membranes. Due to inevitable variability the plane of the roofing structure, low areas will be formed which allow the formation of standing water pools. These pools when frozen and unfrozen place constant stress on the seams between the rubber sheet. Any flaw in the seam will potentially allow water ingress. In addition, during the service life of the roof, which may exceed twenty years, there is the probability of substantial foot traffic over the roofing membrane which creates stresses on the sheeting interface seams. Prior to this invention the most dependable method for seaming the rubber sheets involved a multi-step process for preparing the edges of the rubber sheets for adhesive seaming. First solvents are used to clean off contaminants from the portion of the sheet immediately adjacent the edge used for the lap-splice. These contaminants include dirt, dust, talc, oils and components of the rubber formulation which exude to the surface of the rubber sheet. After solvent cleaning, an adhesive primer is preferably applied to the cleaned edge. The primer typically must be allowed to dry for some period of time. Subsequent to the application of the primer, a solvent-based or liquid adhesive is applied to the edge portions which are to be overlap spliced. The type of adhesive used determines the treatment. If a solvent-based contact adhesive is used, the edge is allowed to dry to the touch prior to overlapping. Full bond strengths may require several weeks to develop. If an air-cure urethane adhesive is used, the edge is immediately overlapped and then allowed to stand undisturbed for a period of time ranging from several hours to several days to allow the adhesive to set up and attain its full bonding strength. A caulk must then be applied to the overlapped edge of the seam in order to protect the adhesive from the attack of water which infiltrates the seam. Of course, over the many years of service the caulk barrier must be renewed to assure seam integrity. This multi-step adhesive process is very labor-intensive and requires handling the same edge portion to be seamed several times during the bonding process. The problems associated with the current adhesive system include (1) its labor and time intensive application methods and (2) the method requires the use of volatile and potentially hazardous solvents, primers and adhesives. The bonds obtained during the seaming process may be (a) inconsistent or flawed due to failure to properly clean the edge: (b) application of a non-uniform adhesive layer: (c) making the overlap seal before sufficient solvent had flashed out of the adhesive (adhesive too tacky): (d) waiting too long after application of adhesive to make the overlap seam (adhesive too dry); and (e) insufficient or non-uniform application of pressure after the seam is made.

It has been surprisingly and unexpectedly found that certain polyolefins function as superior thermoplastic adhesives for bonding ethylene-propylene based rubber sheets to each other. These adhesives surprisingly do not exhibit any adhesive properties when applied and cured with other types of thermosetting rubber polymers. The many disadvantages and poor economics of these previously known systems for splicing EPDM rubber sheeting to roofs are overcome by the use of this invention. It is an object of the invention to provide an environmentally safe adhesive system which eliminates the use of solvents, chemicals and primers. A further object is to provide a simple one step system for seaming adjacent rubber sheets into a water-impervious seam. Another object of the invention is to provide an adhesive which may be applied to the rubber sheeting during its manufacture and supplied for the roofing installation with the adhesive as an integral part of the rubber sheet. An advantage of the adhesive system utilized for the rubber sheeting of this invention is that maximum bond strength is developed within seconds of making the actual splice. A further advantage of the invention is that the adhesive is unaffected by water and adverse environmental conditions in a roofing installation. The adhesive is intimately bonded to the rubber sheeting membrane to provide a very high bond strength.

BRIEF DESCRIPTION OF THE INVENTION

The various embodiments of the invention may be better understood by reference to the following description and the drawings associated therewith.

An aspect of the invention is a method of manufacturing ethylene-propylene rubber sheeting having a heat-activatable thermoplastic adhesive edge portion comprising the steps of:

(a) advancing an indefinite length uncured ethylene-propylene rubber sheet along a horizontal path;

(b) feeding an indefinite length thermoplastic adhesive strip along a second horizontal path parallel to a first edge portion of said rubber sheet;

(c) contacting said adhesive strip in overlapping relationship with said first edge portion of the rubber sheet;

(d) applying pressure to the adhesive strip and rubber sheet to assure intimate contact between said sheet and said strip to form an uncured laminate;

(e) heating said uncured laminate at a temperature sufficient to vulcanize the uncured rubber sheet, soften the thermoplastic adhesive strip and adhere the strip to the sheet to form a cured laminate; and (f) cooling said cured laminate below the softening point of the thermoplastic adhesive strip to form a rubber sheet with an integral heat-activatable adhesive edge portion.

Another aspect of the invention is a method of applying rubber sheeting to a roof comprising the steps of:

(a) positioning on said roof a first predetermined length rubber sheet having a heat-activatable dry adhesive strip on at least one edge portion of said sheet;

(b) overlapping a second predetermined length rubber sheet in superposed relationship to said first rubber sheet such that the heat-activated adhesive edge portion of said first strip is covered by said second rubber sheet;

(c) applying heat and pressure sufficient to melt and fuse said adhesive edge portion of said first sheet to intimately fuse with and adhere to said second rubber sheet;

(d) repeating steps b and c sequentially until the roof is covered with rubber sheeting.

Yet another aspect of the invention is an ethylene-propylene rubber membrane for application to roof structures comprising: a cured ethylene-propylene rubber sheet with an upper surface and a lower surface and at least one strip of a thermoplastic, heat activatable adhesive adhered to the upper surface adjacent to a first lateral edge of the rubber sheet, said thermoplastic adhesive being applied to the rubber sheet prior to vulcanization of the rubber sheet, adhered to the sheet during vulcanization.

Still another aspect of the invention is a composite ethylene-propylene rubber roofing membrane comprising at least two indeterminate length cured ethylene-propylene rubber sheets, each sheet having thermoplastic polyolefin adhesive strips integrally molded with the sheets adjacent the lateral edges of the sheets and extending the length of the sheet, said lateral edges of said sheets overlapping to superpose the thermoplastic adhesive strips therebetween, said thermoplastic adhesive strips being fused together under heat and pressure to form an integral waterproof seam between said overlapped sheets.

An adhesive useful in this invention must have the following characteristics: (1) thermoplastic, (2) a softening point above 105° C., (3) hydrolytically stable, (4) non-tacky at ambient temperature, (5) thermally stable at 400° F. (200° C.). In order to be considered useful for ethylene-propylene rubber roofing or geomembranes the adhesive must be a thermoplastic material and when fused between two sheets of rubber in accordance with ASTM D413, Method A, must give a minimum peel strength of 5 pounds/inch (0.88 KN/m). By way of representative example only, particular polymers which are preferred include polyolefins which is understood to be a polymer or copolymer of one or more monoolefins having no more than six carbon atoms as well as mixtures of these polymers and/or copolymers. More preferred of the polyolefins are the polyethylene copolymers in which ethylene is copolymerized with a four carbon comonomer. such as 1-butene. These preferred polyolefin copolymers have a softening point as determined by ASTM D816, Procedure 19 of between 105° C. and 150° C. The polyolefins which are most preferred have a melt index of greater than 0.5 when measured according to ASTM 1238-57T modified by adding a supplementary load of 3 kg. Excellent bond strengths are obtained when this melt index is above 1.0. The melt index and softening points of the various adhesives are useful characterization properties since the adhesives must withstand the vulcanization of the rubber and be capable of flowing to assure good adhesion to the rubber. However, the adhesive cannot flow excessively during vulcanization because that would lead to voids and inconsistency in the adhesive strips after the curing process. The polyolefins may be compounded with tackifiers, pigments, fillers and processing aids as are conventionally used in hot melt adhesive compounding.

The term rubber or ethylene-propylene rubber as used in this Specification and claims shall, unless specifically differentiated otherwise, always refer to thermosetting elastomers based on ethylene and propylene monomers. The International Institute of Synthetic Rubber Producers (IISRP) classifications for these ethylene-propylene rubbers are:

(1) EPDM—terpolymer of ethylene, propylene and a diene with residual unsaturated portion of the diene in the side chain.

(2) EPM—copolymers of ethylene and propylene. Any elastomers classified as EPDM or EPM by IISRP are specifically included within the scope of this invention.

When the term rubber sheet or sheeting is used herein it is understood to mean a cured or uncured thermosetting elastomer sheet of indeterminate length and having a width considerably less than the length. The direction of the indeterminate length is the longitudinal direction of the sheet. The direction of the width is termed as the transverse direction.

The rubbers may be conventionally compounded with ingredients to enhance physical and mechanical properties. The ingredients include reinforcing pigments, mineral fillers, oils and plasticizers, tackifiers, and antidegradants. The rubbers include various curing agents including sulfur, sulfur donor accelerators, peroxides, zinc oxide and other known curing systems. The presence of the curing or vulcanizing agents in the uncured rubber composition is the primary distinguishing characteristic of a thermosetting rubber sheet as distinguished from a thermoplastic sheet which does not undergo any vulcanization or cure during processing. In the context of this invention it is understood that the term rubber sheet requires that a curing or vulcanizing system be present which changes the essential nature of the sheet when it is subjected to the heat and/or pressure of a curing cycle.

The term softening point refers to the temperature at which the thermoplastic adhesive material softens and begins to flow under stress. In this specification and claims, a softening point having a numerical value is always determined according to ASTM D816, Procedure 19.

BRIEF DESCRIPTION OF THE DRAWINGS

FIG. 1 is a simplified schematic view of the method of manufacturing adhesive-edged cured rubber sheets.

FIG. 2 is a transverse cross-section of a portion of the rubber sheet taken along line 2—2 of FIG. 1.

FIG. 3 is a top view of a rubber sheeting covered roof.

FIG. 4 is a cross-section of the roof and sheeting of FIG. 3 taken along line 4—4.

DETAILED DESCRIPTION OF THE INVENTION

The method of this invention is designed to produce an indefinite length of cured rubber sheet suitable for roofing which includes an integrally bonded heat-activatable adhesive strip constituting at least one portion of the upper or lower surface of the sheet at or near the lateral edge of the sheet. FIG. 1 schematically illustrates the steps of the method of manufacturing such a sheet having integral adhesive edge portions. An uncured rubber sheet 10 is formed by a sheet former 12. The uncured rubber sheet 10 is advanced along a horizontal path A, parallel to the longitudinal direction of the sheet. Letoffs 14a and b dispense adhesive strips 16a, 16b into the consolidator 18 where the adhesive strips 16a and 16b are pressed into intimate contact with the opposite edge portions of uncured rubber sheet 10. The opposite edges 20a and 20b of the uncured rubber sheet 10 form the extreme limits of the adhesive strips 16a and 16b respectively. The adhesive strips 16a,16b are laid parallel to the edge portions 20a and 20b of the strip. In the preferred mode of the invention, strip 16a is aligned such that it is spaced away from the edge 20a on the top surface 22 of sheet 10 while the adhesive strip 16b is aligned parallel to and spaced inward from the opposite edge 20b on the bottom surface. This space allows for placement of a hold-down batten when installed on a roof. The consolidator 18 applies pressure to the uncured rubber sheet and the adhesive strips 16a, 16b to bring them together into intimate contact to form an uncured laminate 26 which is moved to the next step of the process which is the curing station 28 where heat is applied to the uncured laminate 26. The uncured laminate 26 remains in the curing station 28 at a temperature sufficient to activate the curing system in the uncured rubber sheet 10 and vulcanize the rubber compound. This temperature must be high enough to soften the thermoplastic adhesive strip to allow bonding of the adhesive strip to the uncured rubber sheet 10, thus forming a cured laminate 30 having intimately adhered, integral, molded adhesive edge portions 32a and 32b which are on opposite surfaces of the cured laminate 30. The cooling station 34 receives the cured laminate 30 and cools the laminate below the softening point of the thermoplastic adhesive and the cooled cured laminate progresses to the final finishing stage 36 where the adhesive-edged rubber sheet 38 may be spliced with identically prepared additional sheets to form wide membrane or simply placed on a reel for shipping.

FIG. 1 is a simplified schematic representation of the steps of the method of manufacturing the integral adhesive-edged rubber sheeting of the invention. One skilled in the manufacturing of rubber sheeting can envision and devise a number of alternate pieces of apparatus and means of accomplishing the various steps in the process. The sheet former 12 can advantageously be composed of a three or four roll calender as is conventionally used in manufacturing unsupported rubber sheeting or rubber covered fabric. Alternatively a roller head die may be fitted to a large output rubber extruder to form the uncured rubber sheet 10. The sheet former 12 must produce sheets of uniform gauge and the edge portions of the sheet 20a and 20b may advantageously be of thinner gauge than the central portion of the uncured rubber sheet. This step down thickness edge accommodates the gauge of the adhesive strip 16a and 16b to form an uncured laminate 26 which may have nearly uniform gauge across the sheet. The consolidator 18 may be a pair of nip or press rolls which firmly compress the adhesive strip 16a and b into the opposite surfaces of the uncured rubber sheet to assume intimate contact as the adhesive-rubber interface. The press rolls may be immediately adjacent the sheet former, or it may be performed in a completely separate operation. The adhesive strips 16a,16b may optionally be applied directly to the uncured sheet 10 from one or more extruders which deposit a layer of molten adhesive to the sheet 10.

Release strips 17a and 17b may be used to support adhesive strips 16a, 16b. The release tape 17a and b may remain with the finished sheet or it may be stripped off prior to final finishing 36. Take off reels 29a and b are shown in a preferred embodiment of the method where the release strips are taken off prior to the final finishing. The release strips may be conventional release backing which can withstand the temperatures and pressures of curing. Relatively inextensible films, such as oriented polyester films have been found to be adequate release strips.

The curing station 28 may be any conventionally used apparatus for effecting vulcanization of a thermosetting rubber sheet. Pressure and temperature may be supplied in an autoclave or a hot air oven which are suited to non-continuous practice of the method illustrated in FIG. 1. The term, non-continuous, indicates that the sheet in its various stages of preparation may be reeled onto storage rolls between each operation or between groups of operations depending upon the apparatus utilized. A fully continuous method is one where the sheet moves continuously from one step to the next. A preferred curing station 28 apparatus for use as in a continuous form of the method would be a Rotocure apparatus in which a very large diameter heat drum is utilized with a transport belt tensioned around a major portion of the large roll circumference such that the uncured sheet is cured continuously while in pressurized contact with the heated surface of the large diameter roll of the Rotocure. U.S. Pat. No. 2,182,317 illustrates such a curing system. It is understood that if a non-continuous process is utilized—where the sheet may be reeled at intermediate stages onto rolls awaiting transport to the next step of the method—the sheet may be supported on a conventional textile fabric which separates and prevents sticking of adjacent wraps of the uncured sheet.

The cooling stage 34 may be, in its simplest embodiment, an operation following the curing station 28 in which the temperature is brought below the vulcanization temperature of rubber and well below the softening point of the adhesive. This stage is necessary to assure that the adhesive layer does not flow excessively and is properly stabilized prior to final finishing of the cured laminate 30. In a continuous process, the cooling stage 34 may be of a wig-wag conveyor in which the rubber sheet is subjected to circulating air to reduce its temperature below the softening point of the adhesive.

The final finishing stage 36 may simply be the reeling up of the finished indeterminate length adhesive-edged rubber sheet 38 for shipment. In alternate embodiments, the sheet may be spliced by placing sections of predetermined width side by side for splicing into a membrane having much wider dimension than the individual sheet processed according to the method of this invention. By this step sheets as wide as 10 meters may be formed.

FIG. 2 shows a cross section of the adhesive-edged rubber sheet 38 taken along line 2—2 in FIG. 1. The adhesive strips 16b and 16a are positioned respectively on the bottom and top surfaces 24 and 22. The adhesive is integrally bonded to the rubber sheet adjacent to the edge or spaced slightly therefrom.

FIG. 3 and FIG. 4 show a portion of a roof 42 of a building to which adhesive-edged rubber sheets 40, 41, 46 and 48 have been applied to the roof 42 of a building in order to form a water-tight barrier membrane over the entire roof 42 surface. In the method of applying the rubber roofing sheets, a first rubber sheet 40 is positioned on the roof 42 in the predetermined location. It is understood that the rubber sheeting is of any width or length depending upon the type of installation. Typically the width will be predetermined. Common widths of rubber roofing sheeting are 1 to 15 meters. Roll lengths may exceed 60 meters. Rubber sheet 40 has adhesive strips 40a,40b running parallel to the sheet edges. Adhesive strip 40a is on the upper surface parallel to one edge of the sheet 40 and adhesive strip 40b is on the lower surface parallel to the opposite edge of sheet 40. Sheet 41 similarly has adhesive strips 41a and b on the upper and lower surfaces respectively. In the method of applying the rubber roofing, the sheet 40 is positioned on the roof 42 with adhesive strip 40a facing upward away from the roof surface 42. Rubber sheet 41 is positioned parallel to rubber sheet 40 such that the adhesive strip 41b overlaps and lies on top and in contact with adhesive strip 40a. Thus, rubber sheet 41 is overlapped with sheet 40 to superpose the adhesive strip 41b which is situated on the bottom surface of sheet 41 over the strip 40a which is positioned on the top surface of sheet 40. Once the sheets 40 and 41 are positioned on the roof, a suitable means for applying heat and a means for applying pressure are run along the overlap longitudinal seam 43 to soften the overlapped adhesive strips 41b and 40a. A preferred heat source is shown in FIG. 4 where a hot air injector 44 injects a stream of hot air between the adhesive strips and is followed immediately by a pressure roller 45 which exerts pressure E on the top surface of sheet 41 and squeezes the adhesive layers 40a and 41b between the roller 45 and the roof surface 42. The means for exerting pressure must be capable of producing a force sufficient to weld the layers 40a and 40b into a single integral layer with no voids or trapped air. The means for applying heat to the adhesive strips must be capable of heating the adhesive to a point above its softening point. It is understood that the source of heat must precede the source of downward pressure on the overlapped area between sheets 40 and 41. The roof 42 is completely covered by overlapping additional identical sheets 46,48 such as shown in FIG. 3 and FIG. 4 and the seaming the sheets by providing heat and pressure until the entire surface area of the roof 42 is covered. Once the roof is fully covered by rubber sheeting strips spliced together in this way, a weather-tight waterproof membrane is established to protect the roofing substructure from the effects of the environment. When the overlapped seam using the method of this invention was tested, the shear strength as determined by ASTM D816, Method B, consistently exceeded 40 psi pounds per square inch (0.27 MPa).

COMPARATIVE EXAMPLE

The following is a comparison of conventional contact adhesive splicing methods with the integral adhesive edged sheet of this invention.

An ethylene-propylene-diene rubber (EPDM) sheet was utilized in each roofing installation. The rubber sheet is available from The Goodyear Tire & Rubber Company, under the product designation, Versigard TM, having the following properties:

| Property | Rubber Sheeting Value | Test Method |
|---|---|---|
| Thickness | .045 in (1.15 mm) | — |
| Hardness, Shore A | 65 points | ASTM D-2240A |
| Tensile Strength | 1690 psi (11.7 MPa) | ASTM D-412-68 |
| Elongation | 570% | ASTM D-412-68 |
| Tear Resistance, Die C | 180 lb/in (317. KN/m) | ASTM D-674-73 |

Conventional Sheet—Preparation

Type A rubber sheeting with the properties described above was calendered and cured with a surface treatment on upper and lower surface to prevent sticking of the cured sheet when shipped.

Integral Adhesive Edged Sheet—Preparation

Type B rubber sheeting with the properties described above was first calendered from uncured rubber to the correct thickness and a 3 inch wide adhesive strip of a crystalline copolymer of ethylene/1-butene having a softening point between 118° C.-130° C. (ASTM D816, Procedure 19) and a melt index of 2.6 grams when measured according to ASTM 1238-57T modified by adding a supplemental load of 3 kg as the adhesive was supported by a 1 mil (0.025 mm) strip of oriented polyester film. The adhesive strips were continuously positioned 12 mm away from each lateral edge of the uncured rubber sheet on opposite faces of the sheet. The uncured rubber-adhesive laminate was rolled up, supported by nylon curing cloth and transported to a hot air curing oven where it was cured at 150° C. for approximately 12 hours, and subsequently cooled. The fully cured sheet with intimately adhered heat activatable adhesive edges was removed from the curing cloth and simultaneously the oriented polyester support film was stripped away from the adhesive edges in preparation for shipment to the roofing site.

ROOFING APPLICATIONS

Conventional Contact Adhesive Method

Two conventional sheets were overlapped by 15 cm. The overlying sheet edge was folded back to expose the bottom surface. Both surfaces were cleaned with a petroleum solvent (white gas) to remove surface contamination including oils, dirt and talc. In Procedure 1, a solvent-based primer, suitable for EPDM sheeting, was used to apply the cleaned edge. Chemlok TM 3320-19 available from Lord Corporation was applied and allowed to dry for 15-30 minutes depending upon weather conditions. A solvent based-polychloroprene adhesive, available from Uniroyal Chemical Corporation as M-6317, was then applied on both surfaces over the primer and allowed to dry to the touch, approximately 15-20 minutes. Once dry, the contact adhesive covered surfaces were overlapped 15 cm and stitched down with a press roller to assure intimate contact and removal of any trapped air. A seam sealing caulk was then applied to the edge of the seal to prevent water from infiltrating the splice.

In Procedure 2, no primer is applied. The adhesive was applied directly to the cleaned surface, allowed to dry to the touch, stitched down to form the seam, and caulked to seal out moisture. Full strength of the seams made by Procedure 1 and 2.

Integral Adhesive-Edged Sheet Method

Procedure 3 requires that two strips of Type B sheeting be overlapped by 10 cm. The heat activatable adhesive strip on the bottom surface of the top sheet overlaps the adhesive strip on the top surface of the bottom sheet as illustrated in FIG. 4. A hot air gun with an outlet nozzle adapted for sliding between the two adhesive layers is guided along the longitudinal seam at a rate of 2.1 m/minute. This rate is one which melts the adhesive layers sufficiently to fuse the adhesive layers into a single strip. The hot air gun delivered air at about 315°-370° C. but the adhesive layer is heated to about 163°-177° C. The hot air gun was followed immediately by one or more press rollers for assuring intimate fusion of the two adhesive layers. Within 2 to 5 minutes the adhesive had cooled and the longitudinal seal was completed. No caulking was required since the splice was waterproof and the seam strength was fully developed.

batten strip through the bottom membrane in each splice parallel edge of the membrane. Any means for affixing to the roof is useable in addition to a batten strip including discs, plates or metal strips. The overlying sheet is lapped over the batten strip such that the integral adhesive strip on its underside contacts the adhesive strip on the upper surface of the bottom sheet. The seam is then made by heat and pressure application as described in Procedure 3 above to completely seal the batten strip under the membrane. Referring to FIG. 4, the batten strip 49 would be fastened to the roof 42 at the edge of membrane 48. Of course each membrane could have a similar batten strip as required for the application and width of each membrane. It is preferred to have the adhesive strip continue under the batten strip since it serves to reinforce the rubber membrane. This prevents ripping of the membrane during windstorms.

While certain representative embodiments and details have been shown for the purpose of illustrating the

COMPARATIVE RESULTS

| | Type of Adhesive | Application Time, mm (16 Meter Seam) | Seam Strength Aged 7 Days @ 70° C. | |
|---|---|---|---|---|
| | | | *Peel, lbs/in (KN/m) | **Shear psi (MPa) |
| Procedure 1 | Solvent Primer/Adhesive | 27.5 | 7 (1.2) | 45 (.31) |
| Procedure 2 | Solvent Adhesive Only | N.A. | 3 (0.5) | 12 (.08) |
| Procedure 3 | Integral Adhesive | 9.5 | 22 (3.9) | 65 (.45) |

*Peel strength according to ASTM D413, Method A
**Shear strength according to ASTM D816, Method B

Commercial Utility

The advantages of the cured rubber sheeting with integral heat activatable adhesive strips are clearly delineated in the foregoing comparative results. The amount of time required to seam or splice the sheets of this invention is one-third that of conventional adhesive systems. The strength of the seal is dramatically better as shown in both peel and shear values. A further advantage to this method of seaming is not immediately obvious from the data. The samples used for strength testing had to be aged at elevated temperature in order to allow the conventional contact adhesive systems to develop the optimum bond strengths shown in the table. In actual practice in applying rubber sheeting on roofs the best conventional solvent-based contact adhesive requires weeks and even months to develop optimum bond strengths on the roof, the time depends on the ambient temperature and humidity. By contrast, the integral adhesive edged rubber sheet develops optimum bond strength almost instantaneously. The fused layers need only cool to ambient temperature to generate the high strengths shown in the comparative results table. This characteristic is a great practical advantage since the roofers cannot inadvertently disturb previously completed seam integrity by walking over the seam or moving equipment over the membrane. This problem is a significant one with conventional adhesive systems.

This method of using the integral adhesive edged rubber sheeting for roof membrane is equally valuable in mechanically fastened or ballasted installation. In ballasted installations, rock or other aggregate is spread over the fully seamed membrane to prevent lifting or ballooning in high winds. In mechanically fastened applications, a batten strip is fastened into the roof substructure along each seam. The integral adhesive sheet is fully adaptable to this method by simply fastening the invention, it will be apparent to those skilled in this art that various changes and modifications may be made therein without departing from the spirit or scope of the invention.

What is claimed is:

1. An ethylene-propylene rubber membrane for application to roof structures comprising: A cured ethylene-propylene rubber sheet with an upper surface and a lower surface and at least one strip of a thermoplastic, heat activatable adhesive of a copolymer of ethylene and 1-butene having a softening point between 105° C. and 150° C., adhered to the upper surface adjacent to a first lateral edge of the rubber sheet, said thermoplastic adhesive being applied to the rubber sheet prior to vulcanization of the rubber sheet and permeanently adhered to the sheet during vulcanization.

2. The membrane of claim 1 wherein said copolymer has a melt index above 0.5 when determined according to ASTM 1238-57T modified by adding a supplementary load of 3 kg.

3. The membrane of claim 1 further comprising a second strip of thermoplastic adhesive adhered to the lower surface adjacent a second lateral edge of the rubber sheet.

4. A composite ethylene-propylene rubber roofing membrane comprising at least two indeterminate length cured ethylene-propylene rubber sheets, each sheet having thermoplastic polyolefin adhesive strips of a copolymer of ethylene and 1-butene having a softening point between about 105° C. and about 150° C. integrally molded with the sheets adjacent the lateral edges of the sheets and extending the length of the sheet, said lateral edges of said sheets overlapping to superpose the thermoplastic adhesive strips therebetween, said thermoplastic adhesive strips being fused together under heat and pressure to form an internal waterproof seam between said overlapped sheets.

5. The compostie membrane of claim 3 wherein said copolymer has a melt index about 0.5 when determined according to ASTM 1238-57T modified by adding a supplementary load of 3 kg.

6. The composite membrane of claim 4 further comprising a means for affixment positioned between the overlapped lateral edges of said sheets and extending substantially the full length of the integral waterproof seam.

7. The composite membrane of claim 4 wherein the waterproof seam has a peel strength in excess of 0.88 KN/m.

8. The composite membrane of claim 6 wherein said means for affixment is a batten strip.

9. A mechanically fastened composite ethylene-propylene rubber roofing membrane comprising at least two indeterminate length cured ethylene-propylene rubber sheets and a batten strip extending substantially the entire length of said sheets, each sheet having thermoplastic polyolefin adhesive strips of a copolymer of ethylene and 1-butene having a softening point between about 105° C. and about 150° C. intergrally molded with the sheets adjacent the lateral edges of the sheets and extending the length of the sheet, said lateral edges of said sheets overlapping to superpose the thermoplastic adhesive strips therebetween, said batten strip being positioned between said sheets extending parallel to the lateral edges of said sheets such that the adhesive strips on the cured ethylene-propylene rubber sheets are in contact on each parallel side of said batten strip, said thermoplastic polyolefin adhesive strips being fused together under heat and pressure to form an envelope around said batten strip positioned between said sheets thereby forming an integral waterproof seam between said overlapped sheets with said batten strip contained within said seam.

10. A mechanically fastened composite membrane according to claim 9 wherein said adhesive strips extend under and over said batten strip to reniforce said ethyelene-propylene rubber sheeting to prevent ripping of the membrane.

* * * * *